United States Patent
Fiveland et al.

(10) Patent No.: US 10,927,776 B2
(45) Date of Patent: Feb. 23, 2021

(54) TRANSIENT CONTROLLER AND METHOD FOR DUAL FUEL ENGINE

(71) Applicant: Caterpillar Inc., Deerfield, IL (US)

(72) Inventors: Scott B. Fiveland, Washington, IL (US); Daniel Wester, Felde (DE); Arvind Sivasubramanian, Peoria, IL (US); Christopher F. Gallmeyer, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/410,380

(22) Filed: May 13, 2019

(65) Prior Publication Data
US 2020/0362780 A1 Nov. 19, 2020

(51) Int. Cl.
| | | |
|---|---|---|
| *F02D 41/00* | (2006.01) | |
| *F02D 19/06* | (2006.01) | |
| *F02D 41/30* | (2006.01) | |
| *F02D 19/08* | (2006.01) | |

(52) U.S. Cl.
CPC ..... *F02D 41/0027* (2013.01); *F02D 19/0602* (2013.01); *F02D 19/0642* (2013.01); *F02D 19/081* (2013.01); *F02D 41/0007* (2013.01); *F02D 41/0097* (2013.01); *F02D 41/3094* (2013.01); *F02D 2200/0406* (2013.01)

(58) Field of Classification Search
CPC ............. F02D 41/0027; F02D 19/0602; F02D 19/0642; F02D 19/081; F02D 41/0007; F02D 41/0097; F02D 41/3094; F02D 2200/0406
See application file for complete search history.

(56) References Cited

U.S. PATENT DOCUMENTS

| | | | | |
|---|---|---|---|---|
| 3,753,424 A | * | 8/1973 | Haidvogel | ........... F02D 19/0684 123/27 GE |
| 6,640,773 B2 | | 11/2003 | Ancimer et al. | |
| 7,676,321 B2 | * | 3/2010 | Andri | ..................... B60W 10/06 701/104 |
| 8,417,436 B2 | * | 4/2013 | Russell | ................. F02D 35/027 701/103 |
| 8,677,949 B2 | * | 3/2014 | Bromberg | ............... F02B 17/00 123/3 |
| 8,944,027 B2 | * | 2/2015 | Montgomery | ........ F02D 41/403 123/299 |

(Continued)

FOREIGN PATENT DOCUMENTS

| | | |
|---|---|---|
| EP | 2825753 B1 | 8/2016 |
| WO | 2014094156 | 6/2014 |
| WO | WO 2016/073588 A1 | 5/2016 |

*Primary Examiner* — Jesse S Bogue
(74) *Attorney, Agent, or Firm* — Leydig, Voit & Mayer, Ltd.

(57) ABSTRACT

A controller for an internal combustion engine is configured to operate the engine at a desired output power and at a desired air/fuel ratio provided in the cylinder, the desired air/fuel ratio depending on an amount of air, the primary fuel, and the secondary fuel provided to the cylinder selectively; gradually increase a power output of the engine during a transient event from an initial power output, to an intermediate power output, and then to a final power output; during the transient event, simultaneously with the power output increase, increase the amount of the primary fuel and the secondary fuel to produce a rich air/fuel ratio in the cylinder.

15 Claims, 4 Drawing Sheets (56) References Cited

U.S. PATENT DOCUMENTS

| | | | |
|---|---|---|---|
| 9,097,224 B2 | 8/2015 | Moscherosch | |
| 9,239,019 B2* | 1/2016 | Lambert | F02D 41/029 |
| 9,863,342 B2 | 1/2018 | Tulapurkar et al. | |
| 10,018,129 B2 | 7/2018 | Imhof et al. | |
| 10,190,509 B2* | 1/2019 | Lavertu | F02D 19/061 |
| 10,508,605 B2* | 12/2019 | Bernhard | F02D 41/2422 |
| 2005/0247288 A1 | 11/2005 | May | |
| 2013/0152898 A1* | 6/2013 | Ki | F02D 41/0025 |
| | | | 123/406.12 |
| 2014/0366839 A1* | 12/2014 | Sivasubramanian | F02D 19/0628 |
| | | | 123/352 |
| 2014/0366840 A1* | 12/2014 | Sivasubramanian | F02D 19/105 |
| | | | 123/399 |
| 2017/0037795 A1 | 2/2017 | Galindo et al. | |
| 2017/0089278 A1* | 3/2017 | Tulapurkar | F02D 41/1456 |
| 2018/0016996 A1* | 1/2018 | Bernhard | F02D 41/0007 |
| 2018/0073452 A1 | 3/2018 | Gough et al. | |
| 2018/0283268 A1* | 10/2018 | Xiao | F02B 37/14 |

* cited by examiner

TRANSIENT CONTROLLER AND METHOD FOR DUAL FUEL ENGINE

TECHNICAL FIELD

This patent disclosure relates generally to internal combustion engines and, more particularly, to engines configured to operate with more than one type of fuel such as diesel and natural gas.

BACKGROUND

Dual fuel engines are known for various applications, such as generator sets, engine-driven compressors, engine driven pumps, machine, off-highway trucks and others. Typically, such engines are stationary and operate in the field. The operation of such engines by substitution of a certain amount of heavy fuel, such as diesel, with a lighter fuel, such as natural gas, biogas, liquid petroleum gas (LPG) or other types of fuel that may be more readily available and cost effective, makes them more effective to operate.

Nevertheless, it is often the case that engine performance in certain applications that include transient conditions is suboptimal in that sudden increases in engine load is not carried out in an efficient fashion. For example, engine knocking, which describes a condition in which certain areas of an air and fuel mixture in the engine's cylinder detonate at different times, might typically occur when engine load is increased in a short time period and until the engine is able to take up the increased load. Knocking usually results when combustion of some of the air/fuel mixture in the cylinder does not result from propagation of the flame front ignited by a spark plug or, in the case of a dual fuel engine, a diesel pilot or micro pilot, but one or more pockets of air/fuel mixture oxidize.

To address this condition, it has been previously proposed to alter the air/fuel mixture provided to the engine cylinders during transient operation. For example, U.S. Patent Application Pub. No. 2014/0366839A1 to Sivasubramanian et al. (Sivasubramanian), entitled "Transient Event Fuel Apportionment for Multi-fuel Engine System," describes a method for controlling fuel flow in a multi-fuel engine during transient events that includes providing a specified fuel substitution ratio for apportioning multiple fuels available for providing power to the multi-fuel engine to provide input power for operating the engine at a desired engine speed. In accordance with the method, the specified transient fuel substitution ratio is provided to achieve a desired engine response during a transient event. The transient fuel substitution ratio may be specified, or calculated based on a knock limit air fuel ratio or other factors.

While the solution proposed by Sivasubramanian helps improve transient engine response, the method is reactive to a changing engine power and engine speed and does not provide a direct control strategy for limiting power acceptance when the engine operates in gas mode.

SUMMARY

The disclosure describes, in one aspect, an internal combustion engine. The internal combustion engine includes a cylinder block forming a cylinder, a primary fuel supply providing a primary fuel selectively to the cylinder via a primary fuel injector, a secondary fuel supply providing a secondary fuel selectively to the cylinder via secondary fuel injector, and a power output shaft arranged to receive a power output of the engine, the power output shaft mechanically connected with a piston disposed reciprocally in the cylinder. A controller controlling operation of the primary and secondary fuel injectors is configured to operate the engine at a desired output power and at a desired air/fuel ratio provided in the cylinder, the desired air/fuel ratio depending on an amount of air, the primary fuel, and the secondary fuel provided to the cylinder selectively. The controller is programmed to gradually increase a power output of the engine during a transient event from an initial power output to a final power output while simultaneously adjusting the amount of the primary fuel and the secondary fuel to produce a rich air/fuel ratio in the cylinder during the transient event.

In another aspect, the disclosure describes a controller for an internal combustion engine. The internal combustion engine has a cylinder block forming a cylinder, a primary fuel supply providing a primary fuel selectively to the cylinder via a primary fuel injector, a secondary fuel supply providing a secondary fuel selectively to the cylinder via secondary fuel injector, a power output shaft arranged to receive a power output of the engine, the power output shaft mechanically connected with a piston disposed reciprocally in the cylinder, and a controller controlling operation of the primary and secondary fuel injectors. The controller is configured to operate the engine at a desired output power and at a desired air/fuel ratio provided in the cylinder, the desired air/fuel ratio depending on an amount of air, the primary fuel, and the secondary fuel provided to the cylinder selectively, gradually increase a power output of the engine during a transient event from an initial power output, to an intermediate power output, and then to a final power output. During the transient event, simultaneously with the power output increase, the controller increases the amount of the primary fuel and the secondary fuel to produce a rich air/fuel ratio in the cylinder.

In yet another aspect, the disclosure describes a method for operating an internal combustion engine. The method includes operating the engine at an initial state, the initial state having an initial power output at an initial air/fuel ratio, determining that a transient event is present, the transient event requiring the engine to transition to a final power output, wherein the final power output is larger than the initial power output, and activating a transient controller upon determining that the transient event is present. The transient controller operates to increment the power output of the engine from the initial power output to one or more intermediate power outputs during the transient event, simultaneously during incrementing the power output, cause the initial air/fuel ratio to first become rich and subsequently become lean, increment the power output to the final power output, and continue to cause the air/fuel ratio to become lean until a desired final air/fuel ratio is attained at the final power output.

DETAILED DESCRIPTION

In a general aspect, the present disclosure is directed to a system and method for improving engine performance during transient events in a way that maximizes engine available power during the transient event. Transient event, as used herein, is a change of engine operating speed, engine operating load, and/or engine operating speed and load form one state to another. The systems and methods described herein are useful in helping the engine provide a maximum reasonable amount of power during a time period between an initial operating state of the engine, and a final operating state of the engine and during the transient event that lies therebetween.

In one embodiment, the system and method manages engine operation during the transient by implementing a transient strategy when a transient event is detected, determined or assumed to be present. The transient strategy includes introducing a rich air-fuel limit that is set based on signals provided by an in-cylinder pressure module. The fueling values can be predefined and cause extra fuel to be provided that is still below a limit, for example, to a relatively rich air/fuel ratio of 1:1 based on part. As the engine accelerates, and additional air is available in the cylinders, the transient strategy adds more fuel while still maintaining the rich air/fuel ratio. The controller also substitutes diesel for gas, which gas is reduced to a maximum, e.g. 25%, of the total fuel energy input. Still during the acceleration of the engine, as the turbocharger spools up and additional air is made available, more fuel is added while still maintaining the desired air/fuel ratio.

When operation of the engine begins to stabilize, and intake mean effective pressure raises above a threshold, the transient strategy may begin to curb the rate of fueling increase to migrate the air/fuel ratio towards a leaner value. Overall, the transient strategy transitions engine operating points during a transient event from an initial operating point, down towards but still above the knock line, then along the knock line and back up into the normal operating range while the engine power is increasing. During this time, the actual air/fuel ratio may dip below that of the initial operating point but still remain above the knock line. In this way, air/fuel ratio is maximized while entirely avoiding the knock regions of engine operating points.

Figure 1:
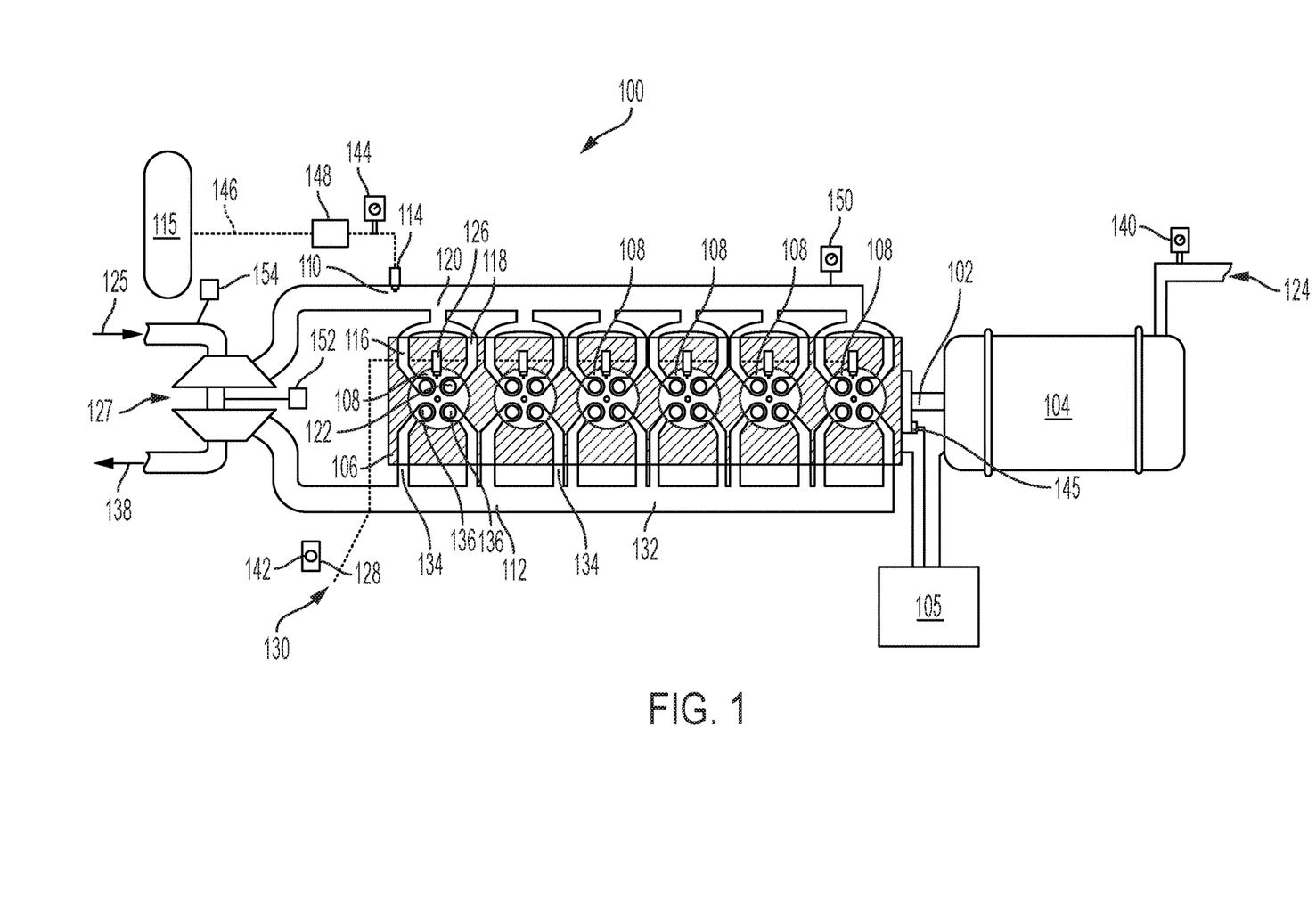
FIG. 1 is a block diagram of an internal combustion engine configured to operate using two fuel supplies in accordance with the disclosure.

An exemplary embodiment of the present invention will now be discussed in the context of a dual-fuel (gas and diesel) engine. FIG. 1 is a block diagram representation of an internal combustion engine 100 in accordance with the disclosure. As shown, the engine 100 is a stationary engine that is part of a generator set. Alternatively, the engine 100 may be part of a machine, marine vessel, off-highway truck, or the like, and be connected to an electrical generator that is part of a hybrid-electric drive system, a fluid pump that is part of a hydrostatic drive system, a transmission that is part of a machine propel system and the like. The engine 100 has an output shaft 102 connected to a generator 104. During operation, the engine 100 may operate at a nearly constant engine speed but at a varying load depending on the electrical power or current output of the generator 104. A controller 105 may be operably associated with various engine and/or generator systems. The controller 105 in the illustrated embodiment includes operable connections to various sensors and systems of the engine 100 and generator 104, and is configured to receive information on the operating parameters thereof as well as send commands to various actuators and systems through the connections.

The controller 105 may be a single controller or may include more than one controller disposed to control various functions and/or features of the system. For example, a master controller, used to control the overall operation and function of the generator set may be cooperatively implemented with an engine controller used to control the engine 100. In this embodiment, the term "controller" is meant to include one, two, or more controllers that may be associated with the engine 100 and that may cooperate in controlling various functions and operations of the engine 100 and generator 104. The functionality of the controller 105, while shown conceptually in FIG. 2 to include various discrete functions for illustrative purposes only, may be implemented in hardware and/or software without regard to the discrete functionality shown. Accordingly, various interfaces of the controller are described relative to components of the generator set shown in the block diagram of FIG. 1. Such interfaces are not intended to limit the type and number of components that are connected, nor the number of controllers that are described.

Accordingly, the controller 105 in the illustrated embodiment is configured to receive information indicative of various operating parameters of the engine 100 and to control various operating parameters of the engine 100, such as fuel injection timing, allowable or desired fuel substitution rates depending on the operating point of the engine 100, intake manifold mean effective pressure, turbocharger shaft speed, cylinder pressure, and others. The engine 100 may include various components and systems, such as lubrication and electrical systems, which have been omitted from FIG. 1 for simplicity. Relevant to the present disclosure, the engine 100 includes a crankcase 106 having one or more combustion cylinders 108 formed therein. Although six cylinders 108 are shown in an inline configuration, any other number of cylinders arranged in different configurations, such as a "V" configuration, may be used.

Each cylinder 108 includes a reciprocable piston defining a combustion chamber that is connectable to an intake manifold 110 and an exhaust manifold 112. Each cylinder 108 includes a direct-injection diesel injector 126. The diesel injectors 126 are connected to a source of pressurized diesel fuel, which provides fuel to each injector 126 via a diesel fuel line 128. Each injector 126 is configured to inject a predetermined amount of diesel fuel 130 into each cylinder 108 in response to an appropriate command from the controller 105 during engine operation. For example, the controller 105 may be configured to receive timing information from the engine 100, which is used to determine the appropriate injection timing for each combustion cylinder 108.

The engine 100 further includes a secondary fuel injector 114 disposed to inject a predetermined amount of fuel into the intake manifold 110. In the illustrated embodiment, for example, the secondary fuel injector 114 is a gas fuel injector 114 that is operably connected to a supply of gaseous fuel or reservoir 115, which may be a tank reservoir or may alternatively be a pressure regulated supply from a field source, such as biogas from a land fill, natural gas from an oil well and the like. The gas fuel injector 114 operates to deliver a predetermined amount of gaseous or another secondary fuel into the intake manifold 110. The fuel delivered mixes with incoming air 125 to form an air/fuel mixture that is admitted into the cylinders 108 via intake valves 122.

During operation, an air/fuel mixture from the intake manifold 110 is admitted into each cylinder 108. Diesel fuel is injected into each cylinder 108 at the appropriate time and duration during engine operation to provide a richer air/fuel mixture than what is already present in the cylinder 108. Compression of this mixture within the cylinder 108 causes auto-ignition of the diesel fuel found therein, which initiates combustion of all combustible fuels found the in the cylinder. This includes the diesel fuel as well as the secondary fuel that was previously delivered to the intake manifold by the secondary fuel injector 114.

The auto-ignition of diesel fuel provided by each injector 126 causes the combustion of an air/fuel mixture present in a compressed state in each cylinder 108. Each cylinder 108 is configured to selectively receive air from the intake manifold 110, which may be at or below atmospheric pressure for a naturally aspirated engine, or may alternatively be under positive gage pressure in a turbocharged or supercharged engine. In the illustrated embodiment, the engine 100 further includes a turbocharger 127 that is fluidly connected in the known configuration between the intake and exhaust manifolds 110 and 112.

During operation, air from the intake manifold 110 is provided to each cylinder 108 via, respectively, first and second intake ports 116 and 118. The first and second intake ports 116 and 118 of each cylinder 108 may be directly connected to an intake plenum volume 120 of the intake manifold 110 or may alternatively be branches of a combined intake port (not shown) that is fluidly open to the intake plenum volume 120. A first intake valve 122 is disposed to fluidly isolate the cylinder 108 from the first intake port 116, and a second intake valve 122 is similarly disposed to fluidly isolate the cylinder 108 from the second intake port 118. When the first and second intake valves 122 are closed, such as during combustion of the air/fuel mixture in the cylinder 108, fluid communication between each respective cylinder 108 and the intake manifold 110 is blocked. Similarly, at least partial opening of either the first and/or second intake valve(s) 122 permits the fluid communication of the cylinder 108 with the intake plenum volume 120 such that air 125 may enter the cylinder 108. The combustion of the air/fuel mixture in the cylinder 108 produces power, which is transferred as torque to the output shaft 102 to drive the generator 104. The generator 104 is configured to provide electrical power through an output node 124. Although two leads are shown in the output node 124, any other appropriate arrangement for electrical power production and distribution, such as multiphase outputs having more than two leads are contemplated.

Exhaust gas remaining after the combustion of fuel from each injector 126 with air from the first and second intake ports 122 within each cylinder 108 is evacuated and collected in the exhaust manifold 112. In the illustrated embodiment, each cylinder 108 is fluidly connectable to an exhaust plenum volume 132 via two exhaust ports 134. Each exhaust port 134 is fluidly isolatable from the cylinder 108 by a corresponding exhaust valve 136. The exhaust gas 138 collected is removed from the exhaust manifold 112. Although two exhaust valves 136 are shown corresponding to each cylinder 108, a single exhaust valve disposed in a single exhaust port per cylinder 108 may be used.

The engine 100 and related generator 104 system includes various sensors that are relevant to the present disclosure. More particularly, an electrical power sensor 140, which is generically illustrated in FIG. 1, is associated with the output node 124 and configured to measure a parameter indicative of an electrical power output of the generator 104 such as electrical voltage and/or current. In one embodiment, the electrical power provided by the generator is also an indication or is correlated to a power output that is provided by the engine 100. Signals indicative of the electrical power measured by the sensor 140 are provided to the controller 105. A diesel flow sensor 142 is associated with the diesel fuel line 128 and configured to measure one or more parameters indicative of a flow rate of diesel fuel that is provide to the injectors 126 during operation of the engine 100. Alternatively, a determination of the total fuel flow rate of diesel fuel may be carried out within the electronic controller 105 based on an aggregate of known diesel injection amounts that are provided by each injection event. In one alternative embodiment, the basis for fuel delivery determination may be made on the basis of each engine stroke or each fuel injection event rather than in the aggregate. When the diesel flow sensor 142 is used, the information or signals indicative of the flow rate of diesel fuel provided to the engine 100 is communicated either directly or indirectly to the controller 105. Additional sensors may be used, such as airflow, air pressure and/or oxygen concentration sensors (not shown) configured to measure parameters of the incoming airflow 125. In the illustrated embodiment, an engine speed sensor 145 is connected to the controller 105 and configured to provide a signal indicative of the speed of the engine, for example, as measured at the shaft 102.

A secondary fuel flow sensor 144 is associated with a secondary fuel supply line 146 at a location downstream from a secondary fuel flow control valve 148. In an embodiment where the secondary fuel is a gas as shown, for example, in FIG. 1, the control valve 148 may be operably associated with the controller 105 and configured to meter the flow of fuel from the reservoir 115 to the injector 114 in response to appropriate signals from the electronic controller 105. The secondary fuel flow sensor 144 may be located anywhere along the fuel line 146. In the illustrated embodiment, the fuel flow sensor 144 is located downstream of the control valve 148. The secondary fuel flow sensor 144 may be any appropriate type of digital or analog output sensor that is configured to provide a signal to the electronic controller 105 that is indicative of the mass flow or volume flow rate of gaseous fluid passing through the injector 114 during engine operation.

Additional sensors can also include an intake manifold air pressure (IMAP) 150, which provides to the controller 105 a signal indicative the pressure of air or a mixture of air and gas within the intake plenum 120, a turbocharger shaft speed (TCS) sensor 152, which provides to the controller an indication of a rotating speed of the turbocharger shaft, and intake airflow (IAF) sensor 154, which provides to the controller 105 an indication of the airflow into the engine, and other sensors.

Figure 2:
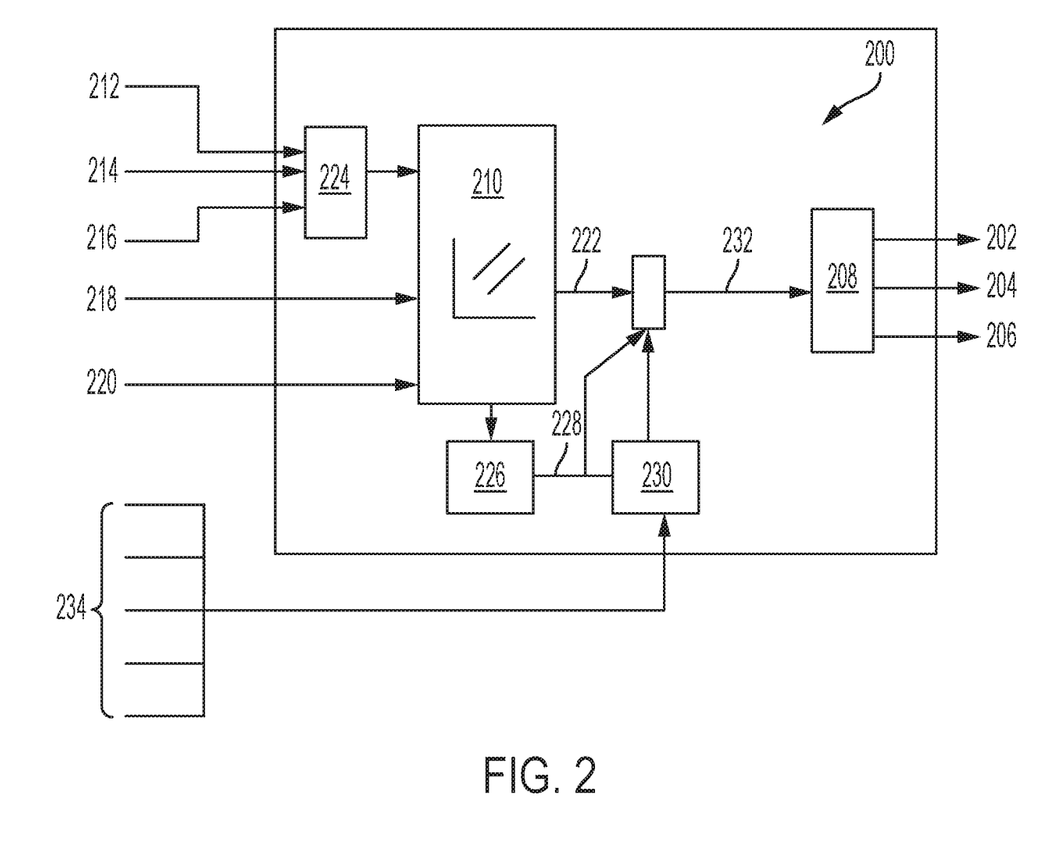
FIG. 2 is a graphical representation of a method for limiting engine power acceptance during a transient in accordance with the disclosure.

A block diagram for a controller 200 is shown in FIG. 2. The controller 200 may be part of a larger control scheme for controlling and monitoring the operation of the engine 100 (FIG. 1). The controller 200 may be further integrated with and be operating within the electronic controller 105 (FIG. 1) such that inputs and outputs of the controller 200 are signals present within the electronic controller 105 that are implemented in hardware of software, for example, in the form of computer-executable instructions.

The controller 200 operates to provide a desired fuel flow or quantity per stroke, per engine cylinder, for each of the two fuels used by the engine, and also a desired injection timing. More specifically, the controller 200 receives various inputs and, based on those inputs, as will be hereinafter described, provides a desired gaseous fuel command 202, a desired diesel fuel command 204, and a desired injection timing command 206 for each of the two fuels. The commands 202, 204, and 206, are determined in a fueling determinator 208, which includes various functionalities that are responsive to signals provided internally in the controller 200.

The controller 200 may operate in many different operating modes, but relevant to the present disclosure the controller 200 may operate in a first, steady state mode, or in a second, transient mode. As used herein, steady state refers to an operating state of the engine in which changes in engine speed or load are generally small or sufficiently slow such that the engine is capable of performing relatively minor adjustments to its engine speed or load without exceeding the abilities of its various systems to track the change. Transient, on the other hand, refers to an operating state in which the engine is changing its operating speed or load at a pace that is faster than its various engine systems can handle without disruption or, stated different, without intervention by the controller 200.

When operating in the steady state mode, the controller 200 may receive information indicative of the operating point of the engine with respect to an engine map 210. It should be appreciated that the engine map 210 may conceptually be considered as a two dimensional array of values that include a desired air/fuel ratio and engine output power, but in practice can be embodied as either an array or any other mathematical relation, including a machine learning model, neural network, and the like, which correlate two or more engine operating parameters to determine the operating state of an engine. In the illustrated embodiment, for sake of discussion, the engine map is depicted as a two dimensional array as shown in FIG. 3.

Figure 3:
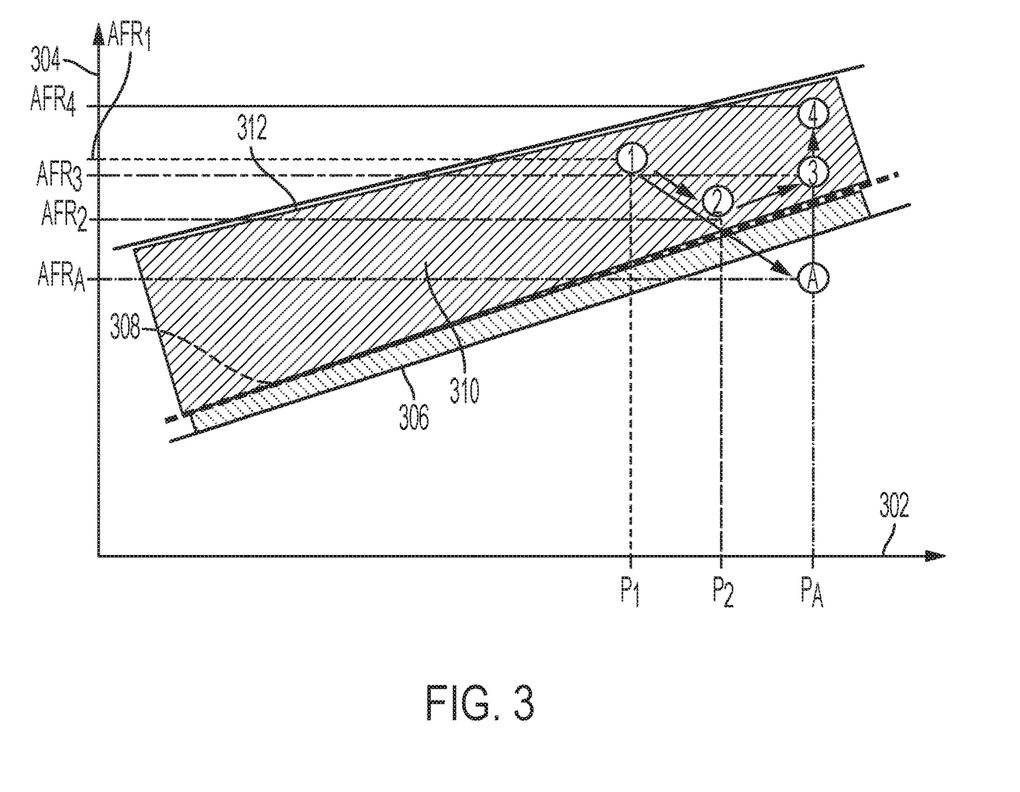
FIG. 3 block diagram of an engine controller in accordance with the disclosure.

In reference to FIG. 3, a version of an engine map 300 is shown. This version of the engine map 300 is plotted against engine power 302, shown along the horizontal axis, and air/fuel ratio 304, shown along the vertical axis. As can be appreciated, the engine map 300 is non-dimension to provide a qualitative basis for the present discussion. Quantitative analyses can be created based on the principles discussed herein to suit many different engine types and applications.

The parameters used for the engine map 300 as shown in FIG. 3, engine power and air/fuel ratio, are dependent on or derive from two main engine operating parameters—engine speed and engine load—and are used to illustrate the main combustion areas of engine operation. Accordingly, the engine map 300 includes a first line 306, which can also be referred to as a knock line 306, which is shown as linear but other shapes can apply. The knock line 306 is made from a collection of engine operating points at which combustion within engine cylinders transitions from being stable to distributed, as it would be in knock conditions, for lower air/fuel ratios at a given engine power output. A secondary line 308, which is shown using dashes and which can also be referred to as a knocking threshold line 308, is offset from the knock line 306 to indicate an area 310 in which the engine operates normally under most conditions.

A top end of the normal engine operating area 310 is defined by a third line 312, which can also be referred to as the misfire line 312, which is shown as linear but other shapes may apply. The misfire line 312 depends on intake manifold pressure and so one of many possible lines is shown. Points lying above the misfire line 312 will indicate an expected misfire if the engine operates at those points, while point lying below the misfire line include points in which cylinder combustion occurs normally.

Plotted on the engine map 300 are particular engine operating points to illustrate an exemplary transient event of an engine, for example, the engine 100 (FIG. 1) using the controller 200 (FIG. 2). In the exemplary transient, the engine may operate at a first operating point 1. A transient change may request that the engine power increases from the first operating point 1 to a final operating point "A." This causes operation to shift from a first or initial power value, denoted as $P_1$, at an initial air/fuel ratio denoted as $AFR_1$, to a final value denoted as $P_A$. As can be seen from the engine map 300, such increase would cause an overall decrease in the air/fuel ratio of the engine, because of the larger amount of fuel that would be required to produce the final power $P_A$ at a constant engine speed and the then present engine operating conditions (including intake manifold pressure, etc.), which would bring the air/fuel ratio of a final value of $AFR_A$ that is below the knock line 306 and, thus, may lead to unstable or undesirable engine operation at least temporarily and while the engine settles into a new stable operating condition following the transient change, as the presently the case with engines in the field.

Instead of allowing knocking to occur, at least temporarily, a system and method in accordance with the present disclosure intervenes during a transient event to control the fuel substitution ratio of the engine and also the air/fuel ratio provided to the engine cylinders until the engine has a chance to stabilize operation. Returning now to the controller 200 block diagram in FIG. 2, it can be seen that the engine map 210 receives input signals that indicate an operating state of the engine, including an engine speed signal 212, an intake pressure signal 214, an intake air flow signal 216, and/or other signals. In addition, a fueling signal 218 and an engine load or power signal 220 are provided to the engine map 210, which determines based on this or other similar information an operating point of the engine, indicated generally as 222. In the embodiment shown, an intermediate module 224 may translate or otherwise transform sensor signals into engine parameters such as load to power, fueling and airflow to an air/fuel ratio, and the like. The operating point 222 is provided to the fueling determinator 208 under stable or near-stable engine operation to control engine operation, as previously discussed.

The controller 200 further includes a transient determinator 226, which monitors the engine operating point determined by the engine map 210 or, alternatively, monitors key engine operating parameters such as engine speed or fueling commands requested, throttle setting, in-cylinder pressure, and the like, to determine when a transient event is imminent or underway. When a transient event is detected, the determinator 226 provides a transient enable signal 228 to a transient controller 230.

The transient controller 230 operates to intervene and adjust the desired or actual engine operating point 222 to produce an adjusted signal 232, which is then provided to the fueling determinator 208. To aid in the explanation of the function of one embodiment of the transient controller 230, reference is made to the transient event depicted in the engine map 300 shown in FIG. 3. As discussed previously, a transient shift from the initial operating point 1 to the final operating point "A" as the engine traverses the transient event (denoted by an arrow) may cause temporarily unstable engine operation as the engine will tend to operate below the knock line 306. By action of the transient controller 230, the engine instead follows a segmented path from the initial power $P_1$ to the final power $P_A$ that avoids crossing the knock line 306.

More specifically, the transient controller 230 causes engine power and air/fuel ratio to change gradually such that the engine operating point is maintained within the normal operating area 310. As shown in FIG. 3, in a first step change, the transient controller increases power from $P_1$ to an intermediate power $P_2$, which corresponds to an intermediate engine operating point 2. The drop in air/fuel ratio, which can also include or at least partially be mitigated by a change to the fuel substitution ratio of the engine, is controlled so that intermediate operating point 2 remains above the knock line 306 and, preferably, also above the secondary line 308 and within the normal operating area 310. The air/fuel ratio at point 2, $AFR_2$, is more rich than $AFR_1$ but more lean than $AFR_A$ so that the engine remains above the knock line 306.

In a second step change, the engine transitions to point 3, as more air becomes available at the higher power of point 2. At point three, the power increases from the intermediate power $P_2$ to the final power $P_A$ and the air/fuel ratio $AFR_3$ becomes leaner (but still remains relatively rich) than $AFR_2$. As the engine continues to provide more air, for example, when the turbocharger(s) has/have spooled up, the engine transitions to a final point 4, which is at the desired power $P_A$ but at a leaner air/fuel ratio $AFR_4$, which is higher than the intermediate air/fuel ratios. One way the transient controller 230 carries out these step-changes in engine operation is by adjusting the fuel substitution rate to include more diesel fuel at points 2 and 3, and to also increase the so-called rack-rate of the engine, which essentially means an increase in the allowable fuel rate to allow the engine to operate at richer air/fuel ratios.

In reference now to the controller 200 (FIG. 2), the transient controller 230 provides an adjustment signal 232, which is combined with various other engine inputs 234 provided from various sensors such as engine speed, engine load, cylinder pressure, air intake, fueling commands, and the like, to the fueling controller 208, which carries out the stepwise changes in engine operating points during a transient event.

INDUSTRIAL APPLICABILITY

Figure 4:
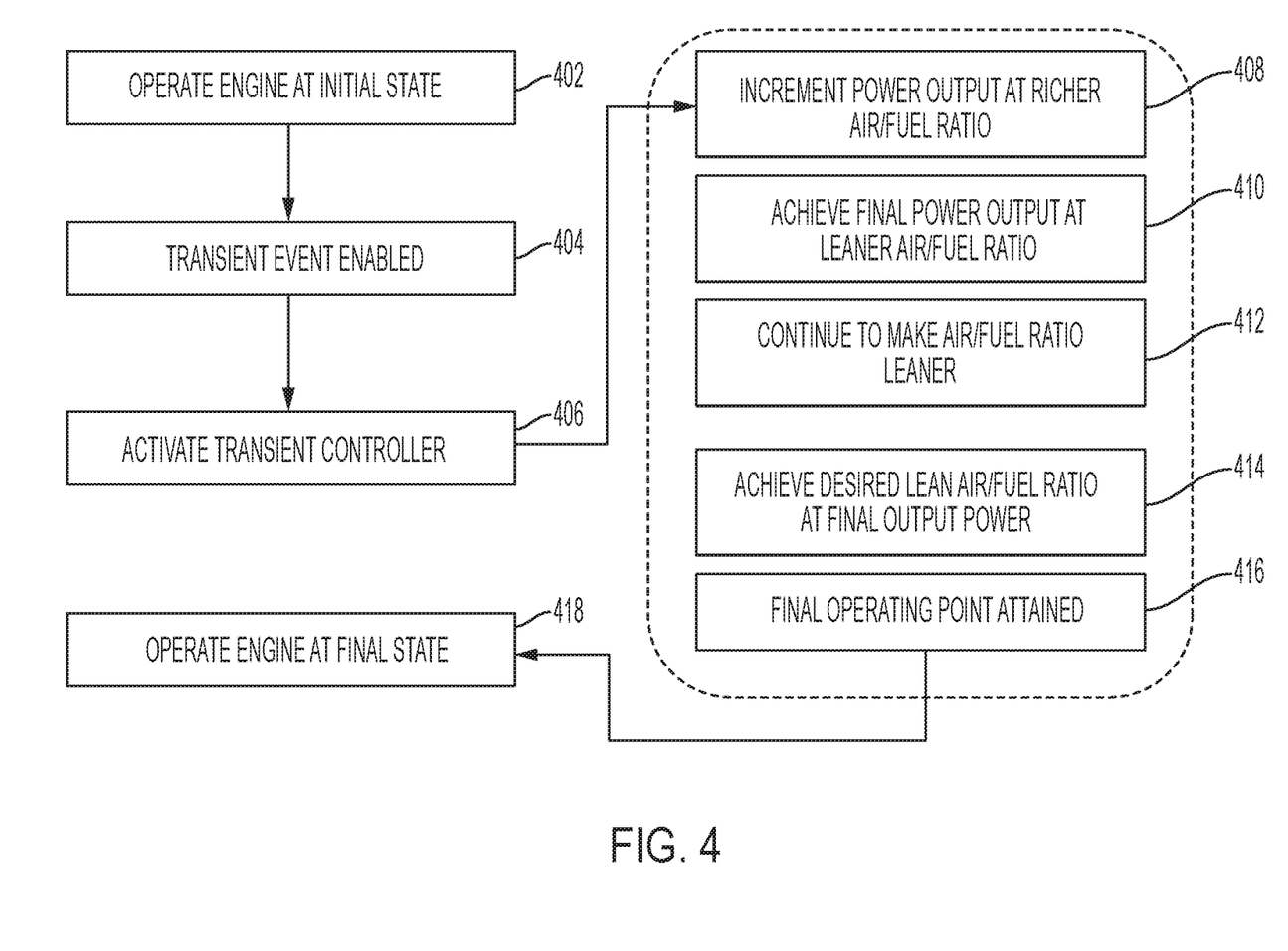
FIG. 4 is a flowchart for a method in accordance with the disclosure.

This disclosure generally relates to dual fuel internal combustion engines. The embodiments described herein specifically relate to engines operating on natural gas, liquefied petroleum gas (LPG), biogas, or any other combustible fuel, and diesel. A flowchart for a method of operating a dual fuel engine during a transient event is shown in FIG. 4. The method includes operating the engine at an initial state at 402 before receiving a command for a transient event at 404 to operate the engine at a final state. While a transient event is present, a transient controller is active at 406. The transient controller includes incrementing a power output of the engine at a richer air/fuel ratio at 408. A power output of the engine is again incremented to the final power at 410 while additional air becomes available and the air/fuel ratio becomes leaner at 412. The air/fuel ratio is gradually made leaner at 412 until a desired air/fuel ratio is achieved at 414 while the engine operates at the final power. When a desired air/fuel ratio and power are achieved at 416, the engine is operated at the final state at 418.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The invention claimed is:

1. An internal combustion engine, comprising:
a cylinder block forming a cylinder;
a primary fuel supply providing a primary fuel selectively to the cylinder via a primary fuel injector;
a secondary fuel supply providing a secondary fuel selectively to the cylinder via a secondary fuel injector;
a power output shaft arranged to receive a power output of the engine, the power output shaft mechanically connected with a piston disposed reciprocally in the cylinder;
a controller controlling operation of the primary and secondary fuel injectors, the controller configured to operate the engine at a desired output power and at a desired air/fuel ratio provided in the cylinder, the desired air/fuel ratio depending on an amount of air, the primary fuel, and the secondary fuel provided to the cylinder selectively;
wherein the controller is programmed to gradually increase a power output of the engine during a transient event from an initial power output to a final power output while simultaneously increasing the amount of the primary fuel and the secondary fuel to control to a richer air/fuel ratio in the cylinder that is above a knocking threshold within the cylinder during the transient event; wherein the primary fuel is diesel and the secondary fuel is a gaseous fuel and the amount of secondary fuel during the transient event accounts for a maximum of 25% of the total fuel energy provided to the cylinder during the transient event.

2. The internal combustion engine of claim 1, wherein the richer air/fuel ratio is at least 1:1.

3. The internal combustion engine of claim 1, further comprising an intake plenum and an exhaust collector fluidly connected with the cylinder, and a turbocharger connected across the intake plenum and the exhaust collector.

4. The internal combustion engine of claim 3, further comprising an intake air sensor disposed to measure a pressure within the intake plenum and provide an intake air pressure signal to the controller, wherein the controller is programmed to adjust the air/fuel ratio based on the intake air pressure signal.

5. The internal combustion engine of claim 3, further comprising a turbocharger shaft speed sensor disposed to measure a turbocharger shaft speed and provide a turbocharger shaft speed signal to the controller, wherein the controller is programmed to adjust the air/fuel ratio based on the turbocharger shaft speed signal.

6. The internal combustion engine of claim 3, wherein the controller operates to provide to the cylinder a predefined ratio of the primary and secondary fuels during a steady state operating mode, and wherein the controller is programmed to alter the predefined ratio such that the amount of primary fuel is increased during the transient event.

7. A controller for an internal combustion engine, the internal combustion engine having a cylinder block forming a cylinder, a primary fuel supply providing a primary fuel selectively to the cylinder via a primary fuel injector, a secondary fuel supply providing a secondary fuel selectively to the cylinder via a secondary fuel injector, a power output shaft arranged to receive a power output of the engine, the power output shaft mechanically connected with a piston disposed reciprocally in the cylinder, and a controller controlling operation of the primary and secondary fuel injectors, the controller configured to:

operate the engine at a desired output power and at a desired air/fuel ratio provided in the cylinder, the desired air/fuel ratio depending on an amount of air, the primary fuel, and the secondary fuel provided to the cylinder selectively;

gradually increase a power output of the engine during a transient event from an initial power output, to an intermediate power output, and then to a final power output, the intermediate and final power outputs being above a knocking threshold of the cylinder;

during the transient event, simultaneously with the power output increase, increase the amount of the primary fuel and the secondary fuel to control to a richer air/fuel ratio in the cylinder that is maintained above the knocking threshold of the cylinder;

wherein the primary fuel is diesel and the secondary fuel is a gaseous fuel and the amount of secondary fuel during the transient event accounts for a maximum of 25% of the total fuel energy provided to the cylinder during the transient event.

8. The controller of claim 7, wherein the richer air/fuel ratio is at least 1:1.

9. The controller of claim 7, wherein the engine further comprises:

an intake plenum and an exhaust collector fluidly connected with the cylinder;

a turbocharger connected across the intake plenum and the exhaust collector;

an intake air sensor disposed to measure a pressure within the intake plenum and provide an intake air pressure signal to the controller; and a turbocharger shaft speed sensor disposed to measure a turbocharger shaft speed and provide a turbocharger shaft speed signal to the controller;

wherein the controller is programmed to adjust the air/fuel ratio based on the intake air pressure signal and the turbocharger shaft speed signal.

10. The controller of claim 9, wherein the controller operates to provide to the cylinder a predefined ratio of the primary and secondary fuels during a steady state operating mode, and wherein the controller is programmed to alter the predefined ratio such that the amount of primary fuel is increased during the transient event.

11. A method for operating an internal combustion engine, the method comprising:

operating the engine at an initial state, the initial state having an initial power output at an initial air/fuel ratio;

determining that a transient event is present, the transient event requiring the engine to transition to a final power output, wherein the final power output is larger than the initial power output;

activating a transient controller upon determining that the transient event is present, the transient controller operating to:

increment the power output of the engine from the initial power output to one or more intermediate power outputs during the transient event, each of the one or more intermediate power outputs being above a knocking threshold of the cylinder;

simultaneously during incrementing the power output, causing the initial air/fuel ratio to first become richer and subsequently become lean while being above the knocking threshold of the cylinder;

increment the power output to the final power output; and continue to cause the air/fuel ratio to become lean until a desired final air/fuel ratio is attained at the final power output;

wherein the primary fuel is diesel and the secondary fuel is a gaseous fuel and the amount of secondary fuel during the transient event accounts for a maximum of 25% of the total fuel energy provided to the cylinder during the transient event.

12. The method of claim 11, wherein the richer air/fuel ratio is at least 1:1.

13. The method of claim 11, further comprising selecting the intermediate power output and the air/fuel ratio based on an intake air pressure of the engine.

14. The method of claim 11, further comprising selecting the intermediate power output and the air/fuel ratio based on a turbocharger shaft speed of the engine.

15. The method of claim 11, wherein the engine is a dual fuel engine operating on a predefined ratio of a primary fuel and a secondary fuel, and wherein the method further comprises altering the predefined ratio such that an amount of primary fuel is increased during the transient event.

* * * * *